SPACE AND TERRESTRIAL COMPUTER

Filed June 7, 1966 16 Sheets-Sheet 1

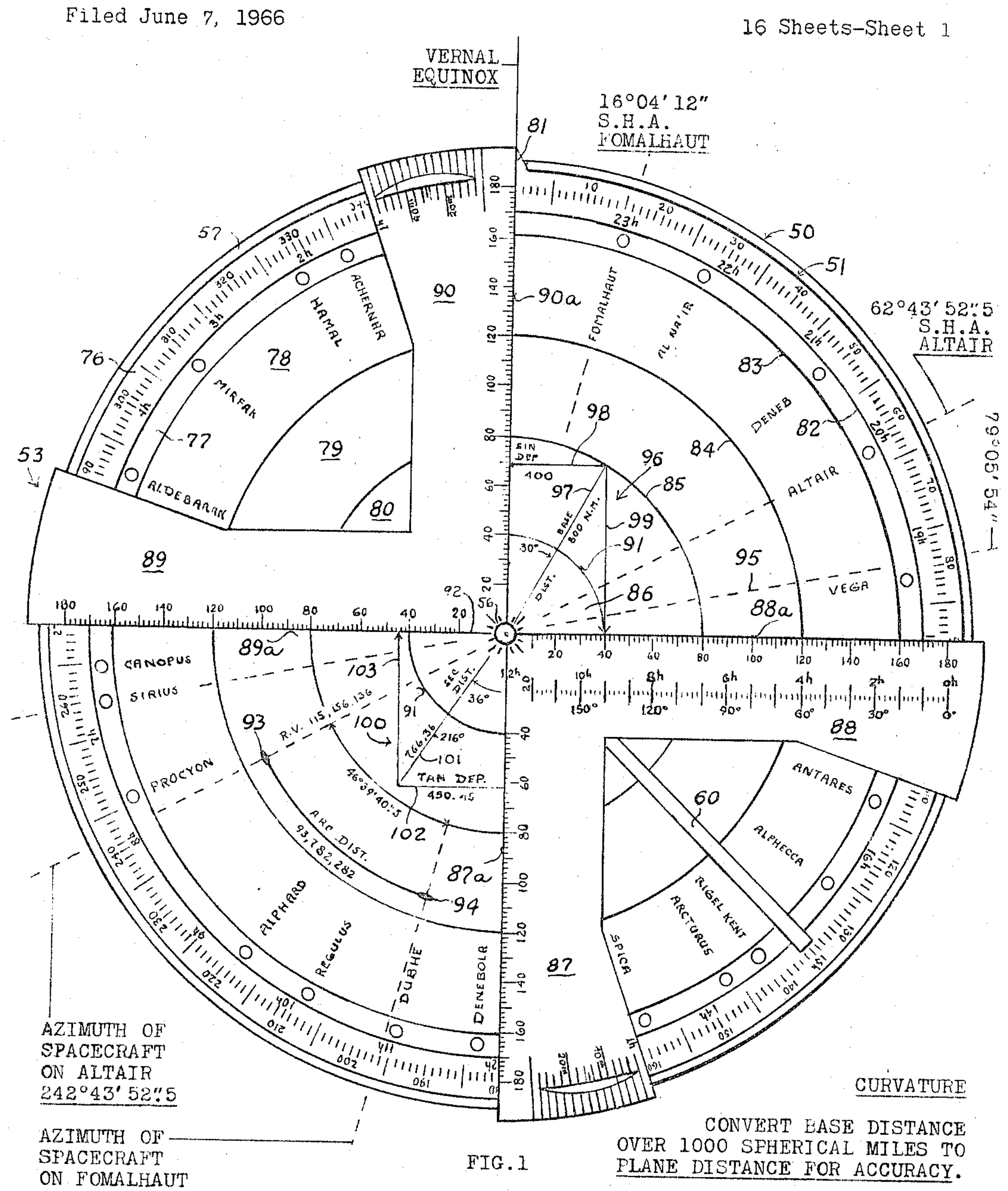

FIG. 1

CURVATURE

CONVERT BASE DISTANCE OVER 1000 SPHERICAL MILES TO PLANE DISTANCE FOR ACCURACY.

DEPARTURE LAT. DIFF. AND DISTANCE BY INSPECTION

FOR SEA, AIR AND LAND POSITIONS, WITH DIST. OR LAT. DIFF. AS BASE, DRAW COURSE ANGLE, MARK DIST. AT INITIAL POINT OF VECTORS AND READ DEPARTURE AND LATITUDE DIFFERENCE AT TERMINAL OF VECTOR.

USE ANY SCALE TO TRILLIONS INCL. LIGHT YEARS WITH OR WITHOUT NEW EXPONENTS FOR ALL KNOWN UNITS OF LENGTH

APP. SOLAR DISK 25'50"
READ RAD. VECTOR
115,156,136

CIR. ARC DIST.
46°39'40.5
x 115,156,136
= 93,782,282

INVENTOR.
Walter E. Thiel
BY J. Lederman
Attorney

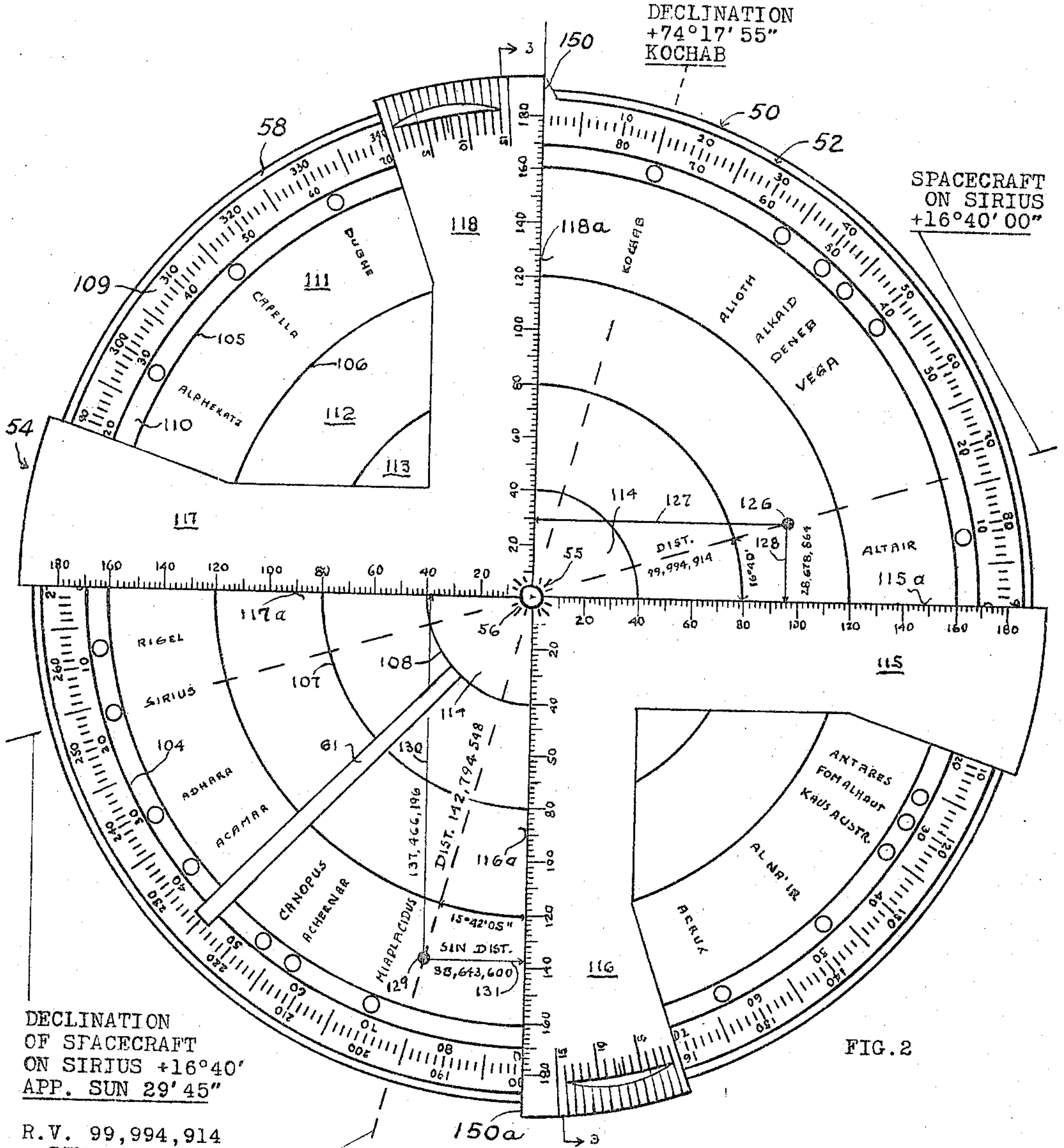

FIG. 2

R.V. 99,994,914
x SIN 16°40′00″
= 28,678,864
+ CEL. EQUATOR

DECLINATION OF
SPACECRAFT ON
KOCHAB-74°17′55″
APP. SUN 20′50″

R.V. 142,794,548
x COS 15°42′05″
= 137,466,196
- CEL. EQUATOR

LONGITUDE AND LATITUDE BY SINGLE STAR OBSERVATION

SIRIUS ON MERID. DUE SOUTH 10/20/65 R.A. $6^h43^m36.4^s$ +12h
SUBTRACT SUN'S A.R.A. FOR 10/20/65 $13^h37^m52.97^s$
LOCAL TIME E.S.T. (A.M.) ............ $5^h05^m43.43^s$
G.T. $10^h01^m23^s$ DIFF.=$4^h55^m40^s$ CONV.TO ARC=LONG.W.73°55′

ALTITUDE AFTER CORRECTIONS 32°27′
90°-32°27′ = 57°33′ SUBTRACT DEC.
OF SIRIUS - 16°40′
LATITUDE IS 40°53′N.OCT. 20, 1965

INVENTOR.
Walter E. Thiel
BY J. Ledermann
Attorney

Oct. 17, 1967 W. E. THIEL 3,347,459

SPACE AND TERRESTRIAL COMPUTER

Filed June 7, 1966

16 Sheets-Sheet 3

INVENTOR.

Walter E. Thiel

BY J. Ledermann

Attorney

Oct. 17, 1967 W. E. THIEL 3,347,459
SPACE AND TERRESTRIAL COMPUTER
Filed June 7, 1966 16 Sheets-Sheet 4

TOP SIDE OF TOP
DISC QUADRANT 2

INVENTOR.
Walter E. Thiel
BY J. Ledermann
Attorney

Oct. 17, 1967 W. E. THIEL 3,347,459
SPACE AND TERRESTRIAL COMPUTER
Filed June 7, 1966
16 Sheets-Sheet 5

TOP SIDE OF
MIDDLE DISC
QUADRANT 1

INVENTOR.
Walter E. Thiel
BY
J. Ledermann
Attorney

TOP SIDE OF MIDDLE DISC QUADRANT 3

INVENTOR

Walter E. Thiel

BY J. Ledermann

Attorney

Oct. 17, 1967

W. E. THIEL 3,347,459

SPACE AND TERRESTRIAL COMPUTER

Filed June 7, 1966

16 Sheets-Sheet 7

BOTTOM SIDE OF MIDDLE DISC QUADRANT 2

INVENTOR

Walter E. Thiel

BY I. Lebermann

Attorney

Oct. 17, 1967 W. E. THIEL 3,347,459

SPACE AND TERRESTRIAL COMPUTER

Filed June 7, 1966

16 Sheets-Sheet 8

BOTTOM SIDE OF
MIDDLE DISC
QUADRANT 4

INVENTOR.
Walter E. Thiel

BY J. Ledermann
Attorney

TOP SIDE OF BOTTOM DISC QUADRANT 3

INVENTOR
Walter E. Thiel
BY J. Ledermann
Attorney

Oct. 17, 1967 W. E. THIEL 3,347,459

SPACE AND TERRESTRIAL COMPUTER

Filed June 7, 1966

16 Sheets-Sheet 10

BOTTOM SIDE OF BOTTOM DISC QUADRANT 3

INVENTOR

Walter E. Thiel

BY J. Ledermann

Attorney

BOTTOM SIDE OF TOP DISC QUADRANT 3

INVENTOR
Walter E. Thiel
BY J. Ledermann
Attorney

Oct. 17, 1967 W. E. THIEL 3,347,459

SPACE AND TERRESTRIAL COMPUTER

Filed June 7, 1966 16 Sheets-Sheet 12

BOTTOM SIDE OF TOP DISC QUADRANT 4

INVENTOR.
Walter E. Thiel
BY J. Ledermann
Attorney

Oct. 17, 1967 W. E. THIEL 3,347,459

SPACE AND TERRESTRIAL COMPUTER

Filed June 7, 1966

16 Sheets-Sheet 13

INVENTOR

Walter E. Thiel

BY J. Ledermann

Attorney

Oct. 17, 1967 W. E. THIEL 3,347,459

SPACE AND TERRESTRIAL COMPUTER

Filed June 7, 1966

16 Sheets-Sheet 14

*INVENTOR.*

Walter E. Thiel

*BY* J. Ledermann
Attorney

Oct. 17, 1967 W. E. THIEL 3,347,459

SPACE AND TERRESTRIAL COMPUTER

Filed June 7, 1966

16 Sheets-Sheet 15

INVENTOR

Walter E. Thiel

BY J. Ledermann

Attorney

Oct. 17, 1967

W. E. THIEL 3,347,459

SPACE AND TERRESTRIAL COMPUTER

Filed June 7, 1966

16 Sheets-Sheet 16

*INVENTOR.*

Walter E. Thiel

BY J. Ledermann
Attorney

United States Patent Office 3,347,459
Patented Oct. 17, 1967

3,347,459
SPACE AND TERRESTRIAL COMPUTER

Walter E. Thiel, 3200 Netherland Ave., New York, N.Y. 10463

Filed June 7, 1966, Ser. No. 555,909
8 Claims. (Cl. 235—88)

ABSTRACT OF THE DISCLOSURE

This computer is composed of a middle disc, top and bottom discs, and top and bottom approximately cross-shaped members, all made of stiff sheet material and pivotally joined at their center points which represent the center of the sun. The top disc has printed on its top side a peripheral hour-angle scale and radial lines of indicia including symbols for the names of prominent stars, their times of right ascension and their annual change in right ascension, all circumferentially positioned with respect to the hour-angle scale according to their space azimuth positions. The four arms of the said member have straight edges radiating from the sun and bearing base scales whose zero is at the sun. The bottom side of the bottom disc has peripheral scales and radial lines of indicia including the names of and symbols for said stars, their declinations and their annual change in declination, all circumferentially spaced with respect to the peripheral scales thereon in accordance with their declinations. The bottom cross-shaped member is identical to the top member. On both sides of the middle disc, and on the concealed sides of the top and bottom discs, are radial lines of indicia including precalculated astronomical and trigonometrical data useful for space and terrestrial navigation. Each disc has a radial window for observing any line of indicia on the concealed sides of the disc.

This invention relates broadly to manually operated computers of the rotatable disc type, and more particularly it provides a novel, inexpensive and light weight time and work saving computer for terrestrial and space navigation. Among the objects the invention are the provision of the following:

Means and methods for ascertaining both space and terrestrial positions by inspection;

A space compass in which the sun and most of the brightest stars are coordinates;

For space travel, readily observible, by inspection, precomputed solar distances based on the observed diameter of the sun;

Means and methods for rapid visual orientation in space using three coordinates such as the sun, a star and a spacecraft;

Means and methods for mechanically indicating space azimuth of spacecraft in relation to the sun and stars by inspection;

Means and methods for mechanically indicating space declination and/or altitude of spacecraft in relation to the sun and stars by inspection;

Means and methods for mechanically indicating by inspection terrestrial longitude in relation to Greenwich time which is also known as World time;

Means and methods for mechanically indicating closely approximate terrestrial departure, latitude difference and distances by direct reading without requiring calculations;

Means and methods by which observation of a single star serves to indicate terrestrial longitude and latitude in relation to Greenwich time; and Providing base scales which can be used with exponents to represent any unit of length up to quadrillions or higher, light years and megaparsecs if required, as well as fractions of such units.

Contemporary navigation methods based on diurnal motions of the stars are obsolete in space where the stars are motionless except for a few seconds of time in annual change and where even to the nearest star, a distance of about 120,000,000 miles, is required to obtain an angular separation of only one second of arc.

Because of the time lag, radar will be of reduced value in space. It is a known fact that inertial guidance is subject to mechanical and human failure and may also be subject to other as yet unknown causes of failure in space. Astronauts are under great stress in space; they must be relieved of operational duties which can be performed mechanically yet for their own security they must control all operations including the most important, that is, correct navigation.

The above as well as additional objects will become apparent in the following description wherein reference numerals refer to like-numbered parts in the accompanying drawings. For the purpose of ready identification of the various mutually pivoted parts of the computer, the representation thereof in FIG. 1 will be considered as looking down upon the top of the computer and that in FIG. 2 as looking up at the bottom thereof. Further, all sides or surfaces of the computer parts which face upward toward the top thereof will be considered the top sides, while all which face downward toward the bottom will be considered the bottom faces or sides of the parts.

Referring briefly to the drawings,

FIG. 1 is a substantially reduced view looking down upon the computer; however, because of the substantial reduction in size, the symbols representing stars are shown circular rather than as stars, the circumferential graduations on the visible periphery of the middle disc have been omitted, as have also some of the legends which are shown on the full size views described below. Additionally, legends indicative of examples discussed below are shown on and around FIG. 1.

FIG. 2 is a similarly reduced view looking up at the computer from the bottom thereof, and the same qualifications mentioned as to FIG. 1 apply also to FIG. 2.

Figure 3:
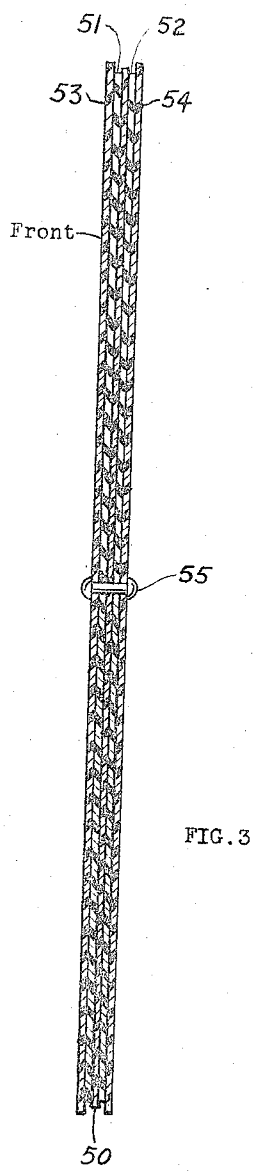
FIG. 3 is a sectional view taken on the line 3—3 of FIG. 2.

Referring in detail to the drawings, and first to FIGS. 1–3, the computer is seen to be formed of a middle disc 50 between the top disc 51 and the bottom disc 52, the diameter of the middle disc being larger than that of the top and bottom discs. These three discs as well as the cross-shaped member 53 at the top of the computer and the similarly shaped member 54 on the bottom thereof, are all concentrically pivoted together on a pivot axis or pin 55 which is shown surrounded by a drawn circle and rays symbolic of the sun. Owing to the larger diameter of the middle disc, there is exposed between the circumference thereof and the front disc 51 an annular area 57; likewise there is a similar area 58 provided on the back side of the middle disc around the circumferential edge of the bottom disc 52. Owing to the very small radial dimension of these exposed annular areas, no graduations or symbols have been shown in FIGS. 1 and 2, but such are shown on the enlarged quadrants of the middle disc as described below.

It is believed desirable at this point to proceed first with descriptions of the concealed sides or surfaces of the top and bottom discs and both sides of the middle disc which are, except for the annular areas 57 and 58 of the middle disc, also concealed. Each of these surfaces has imprinted thereon in a radially arranged pattern a table of circumferentially spaced lines of useful data which is immediately at hand for inspection as will be made clear. The disc 51, FIGS. 1 and 11, has a radial window 60; the disc 52 has a radial window 61, FIGS. 2 and 10, and the middle disc 50 has a radial window 62, FIG. 7.

Figure 11:
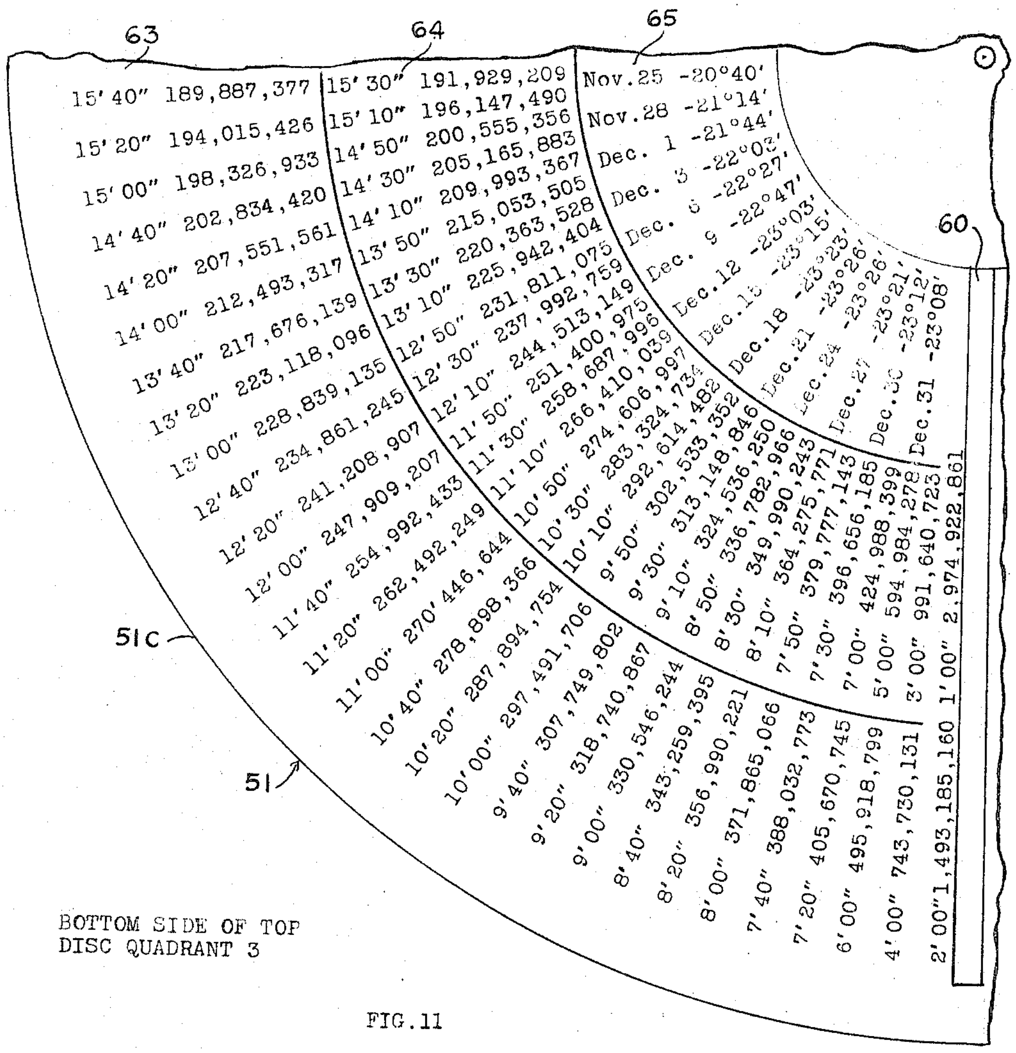
FIG. 11 illustrates the bottom side of the top disc, quadrant 3, with indicia typical of the said side of the bottom disc and the location of the window 60 with respect to said indicia.

FIG. 11 shows the third quadrant 51*c* of the bottom side of the top disc 51. Concentric circles are shown dividing the surface into three annular areas 63, 64 and 65. The various data on this surface as well as on all of the concealed surfaces of the other discs, are provided as stated above, with circumferential tables arranged in radial lines of data. In the areas 63 and 64 appear first, printed apparent angular equatorial solar diameters beginning adjacent the window 60 at various increments through the four quadrants of the said areas. Adjacent each such diameter appears the actual pre-calculated distance in statute miles of the observer from the sun. Thus, by aligning both windows 61 and 62 and lining them up radially with whatever solar diameter is observed, the observer's distance from the sun may be seen by inspection through the aligned windows looking, of course, at the computer bottom-side up as it appears in FIG. 2. Thus travelers in a spaceship may, merely by inspection, ascertain, almost instantly, their distance from the sun.

Within the innermost area 65 of the said bottom side of the top disc, FIG. 11, are the apparent solar declinations arranged in radially extending lines, at dates successfully spaced circumferentially at intervals of three days for a period extending from July 12 through December 31 for epoch 1965. The utility of this table is obvious. Apparent solar declination changes only slightly from year to year and is added to corrected altitude from March 22 to September 23 and subtracted from corrected altitude from September 24 to March 21 of each year to ascertain the terrestrial latitude.

Figure 5:
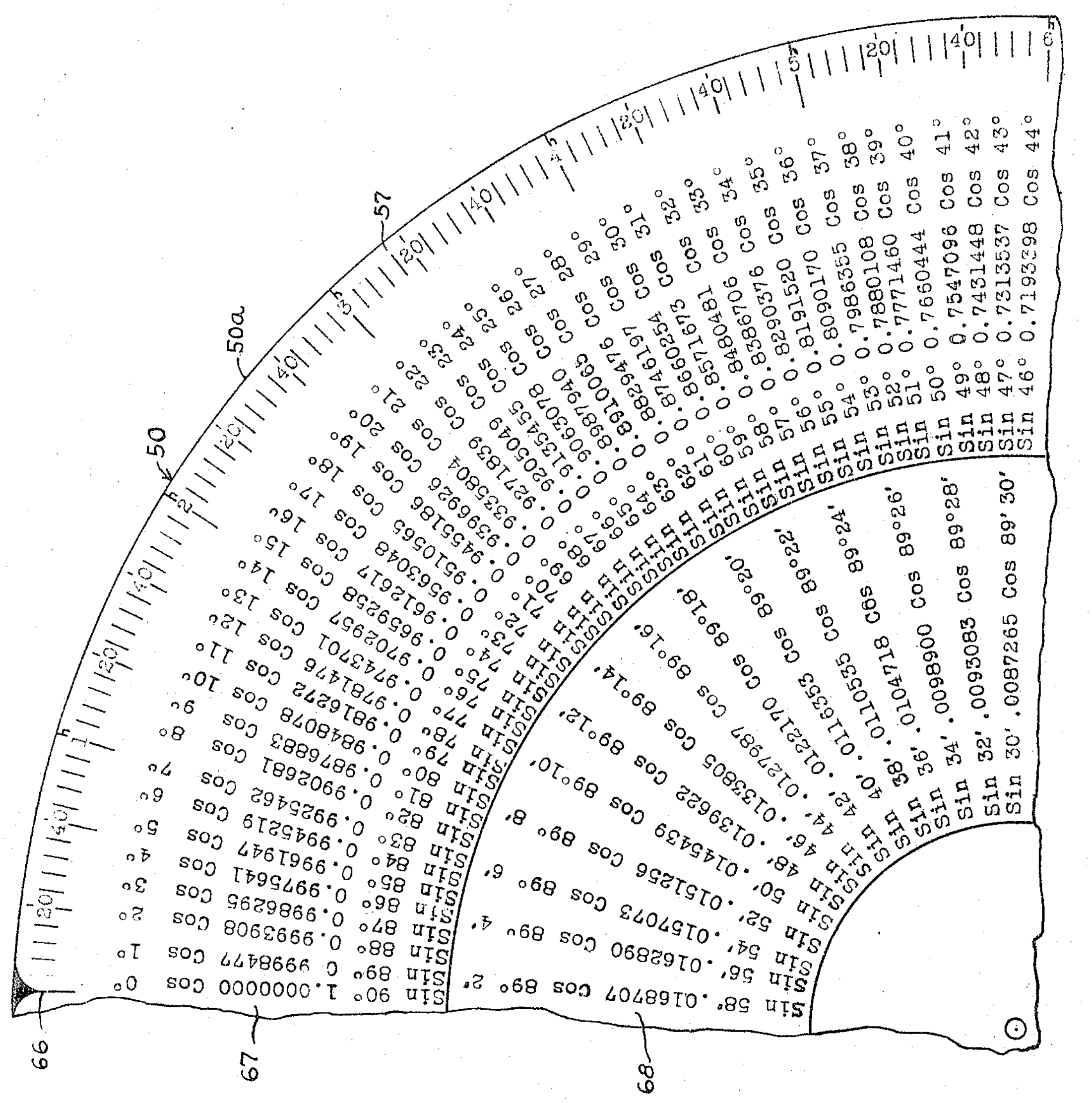
FIG. 5 illustrates the top side of the middle disc, quadrant 1, with indicia typical of the first two quadrants of the top side of the said disc.
Figure 6:
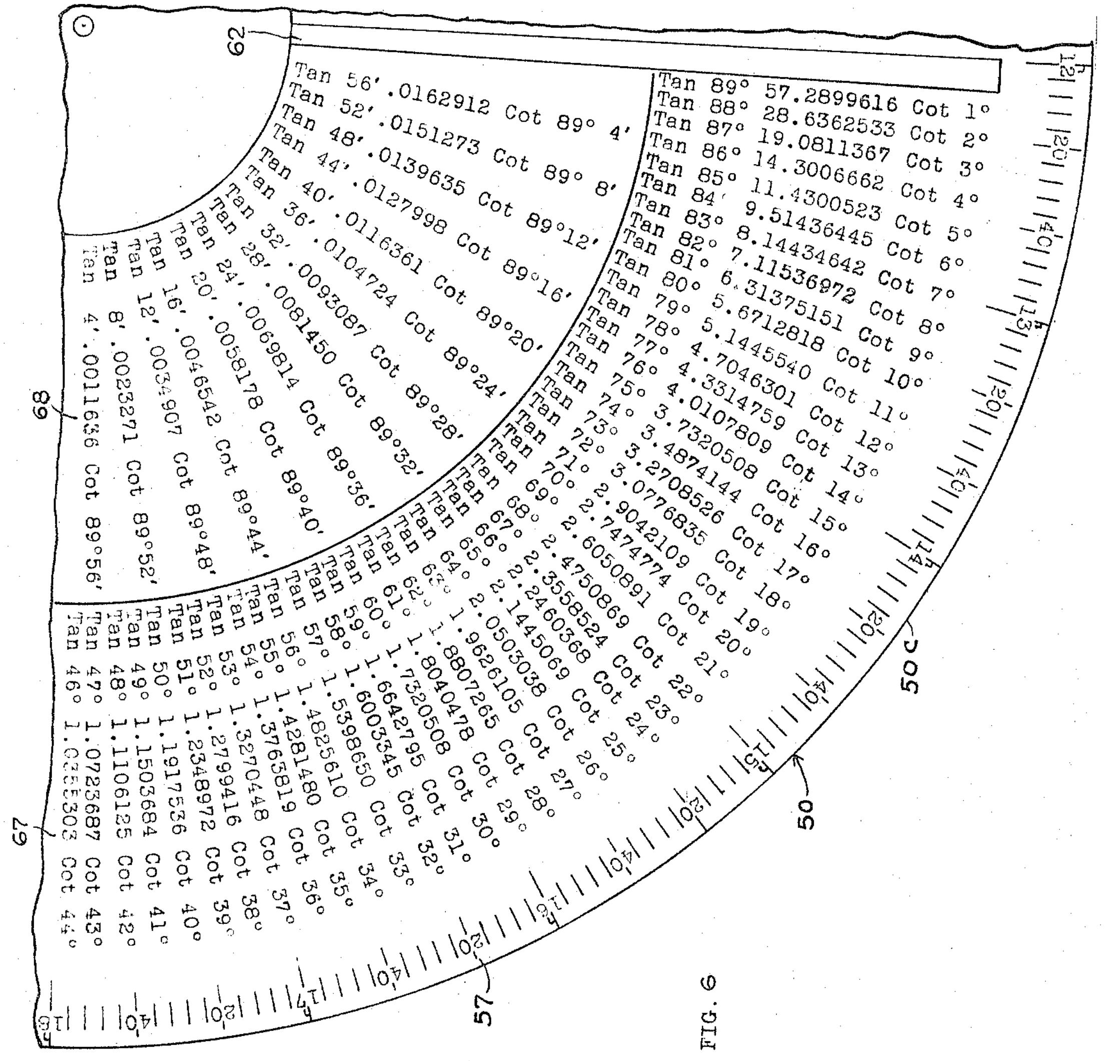
FIG. 6 illustrates the top side of the middle disc, quadrant 3, with indicia typical of the last two quadrants of the top side of the said disc and the location of the window 62 with respect to said indicia.

FIG. 5 shows the first quadrant 50*a* of the top side of the middle disc 50, and FIG. 6 shows the third quadrant 50*c* thereof. Adjacent the circumferential edge of this face in the visible space 57, FIG. 1, thereof, a continuous circumferential twenty-four hour time scale is imprinted, beginning with the zero or twenty-four hour point at the junction between the first and fourth quadrants which is indicated in FIG. 5 by an index mark 66. Each hour on the scale is designated by the letter "h" and the scale is divided into four-minute intervals. Radially inward from this time scale are shown concentric circles defining annular areas 67 and 68. Through the first two quadrants of which only the first is shown at 50*a* in FIG. 5, in the area 67, beginning at the index mark 66, are arranged sine and cosine functions for angles of sizes varying in one-degree intervals as, for example, from zero to 89 degrees (for cosines) and from 90 degrees to zero for sines. Within the area 68 in the same first two quadrants, are arranged sine functions mostly at two-minute intervals for angles up to fifty-eight minutes and for their complementary angles, cosine functions. Extending through the last two quadrants of which only the third is shown at 50*c* in FIG. 6, are similar arrangements of tangent and cotangent functions. It is obvious that by turning the top disc 51 to align its window 60 with the angle of which it is desired to obtain any of the stated functions, such function may readily be observed by inspection.

Figure 7:
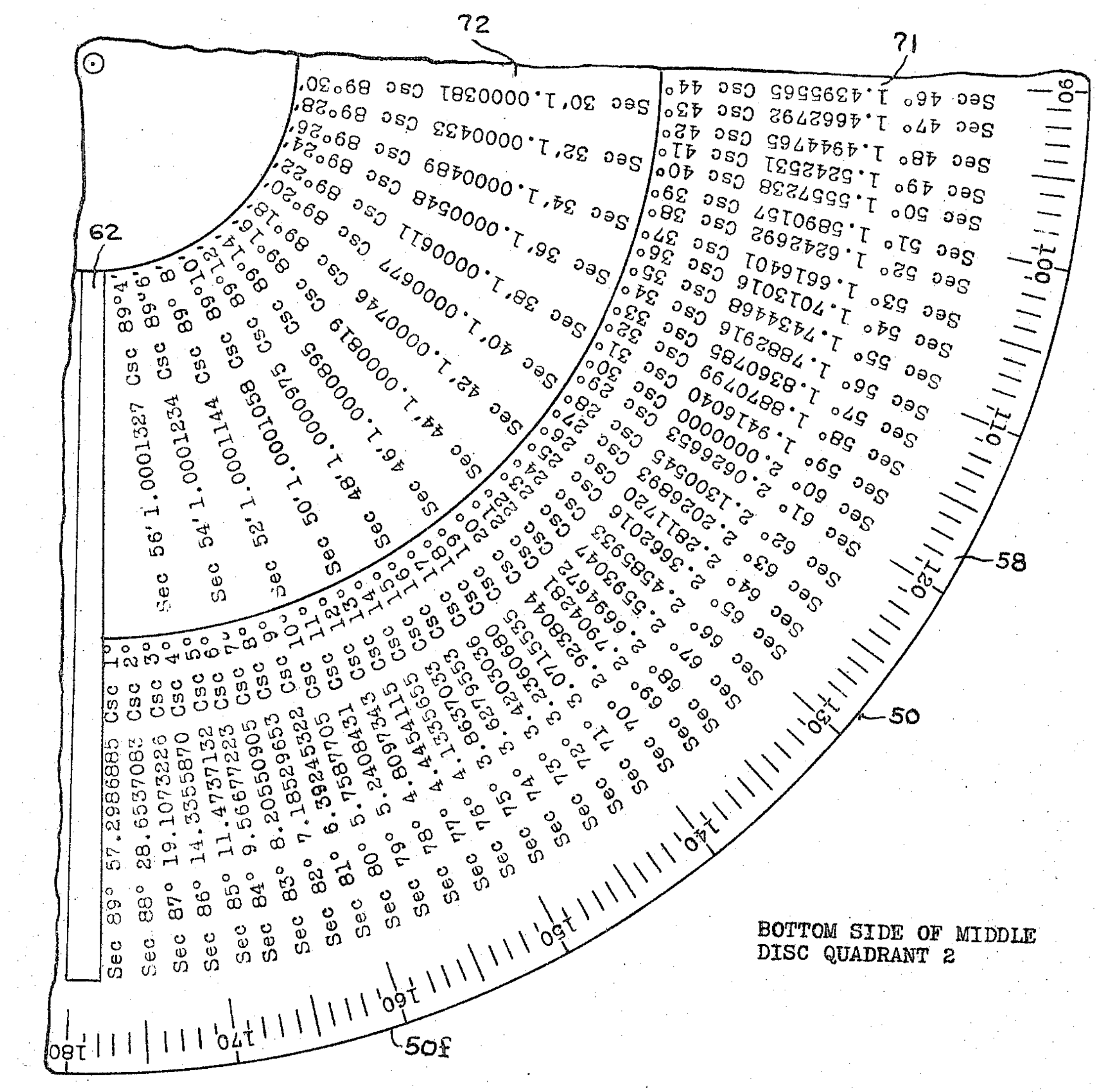
FIG. 7 illustrates the bottom side of the middle disc, quadrant 2, with indicia typical of the first two quadrants of the bottom side of the said disc and the location of the window 62 with respect to said indicia.
Figure 8:
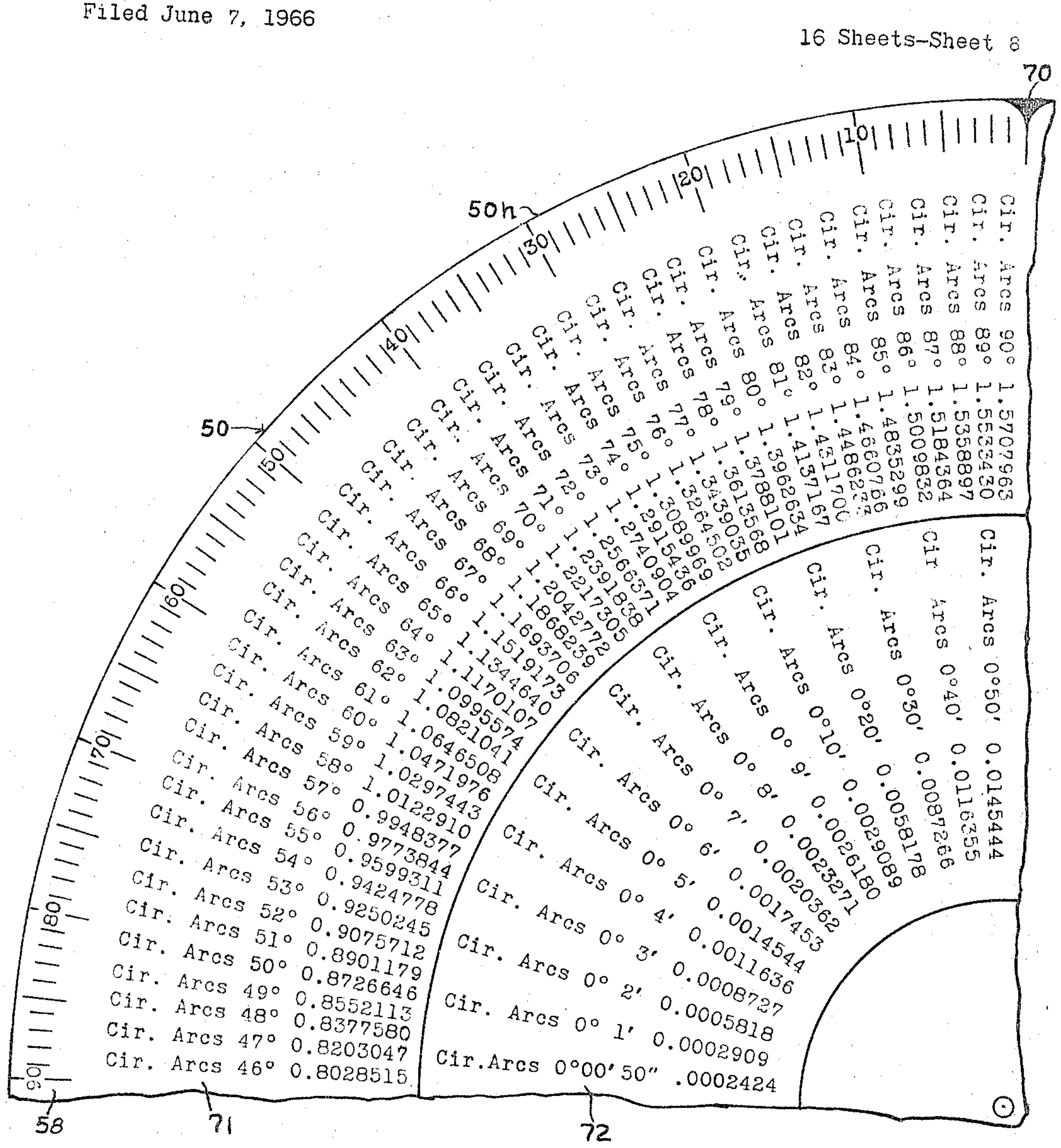
FIG. 8 illustrates the bottom side of the middle disc, quadrant 4, with indicia typical of the last two quadrants of the bottom side of said disc.

In FIG. 7 which shows only the second quadrant 50*f* on the bottom side of the disc 50, there is provided around the disc in the space 58, FIG. 2, a circumferential scale divided into two 180 degree sections reading in opposite directions from the zero index mark 70 shown in FIG. 8. This scale is divided into one-degree intervals. Concentric circles define the area within the space 58 into two annular areas 71 and 72. Throughout the area 71 and extending over the two first quadrants, are arranged in radial lines the values of secant and cosecant functions from zero angle to an angle of 89 degrees at intervals of one degree. Throughout the area 72 through the same two quadrants are similarly provided values for similar functions ranging through an angle of one degree mostly in increments of 2′. Thus, by looking through window 61, FIG. 2, in the bottom disc 52, such functions of a desired angle may readily be seen by inspection.

Throughout the area 72 in the last two quadrants of which only the fourth is shown in FIG. 8 at 50*h*, and the functions of circular arcs ranging from one degree through 90 degrees at one degree intervals, are given. Similarly arranged within the area 71 through the same two quadrants, are provided functions of circular arcs varying at smaller increments. Thus, given the arc or angle, the function for the arc may readily be obtained by lining up the window 61 with the arc, or given the function the arc is readily obtained.

Figure 9:
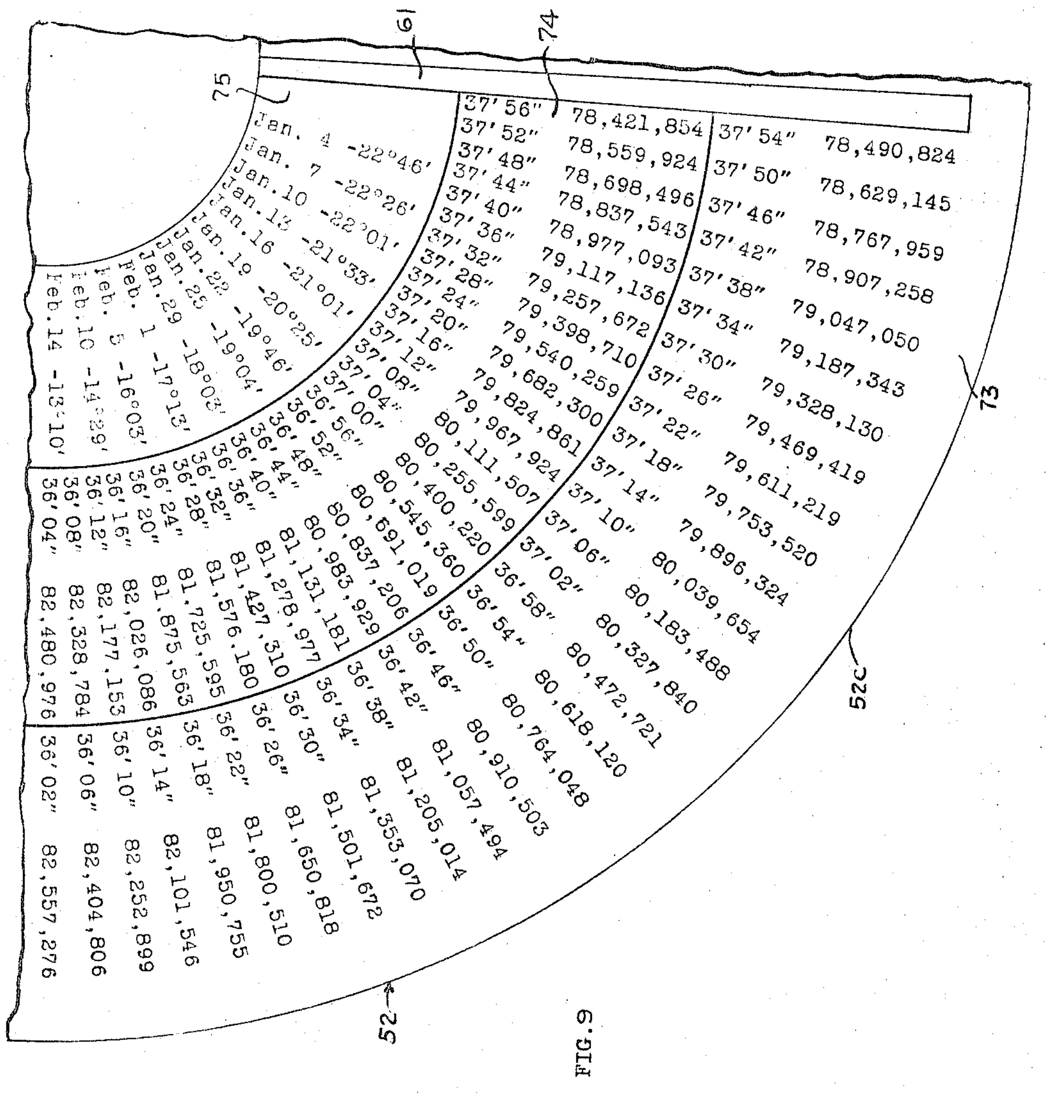
FIG. 9 illustrates the top side of the bottom disc, quadrant 3, with indicia typical of the top side of the bottom disc and the location of the window 61 with respect to said indicia.

FIG. 9 shows at 52*c* only the third quadrant of the top side of the bottom disc 52, with its window 61. Concentric circles define three similar areas 73, 74 and 75. Both areas 73 and 74 bear, in radial lines, precalculated distances in statute miles to the sun for various apparent equatorial diameters of the sun as measured by an observer in space. These angles range, reading counterclockwise, through selected small intervals, such as shown, for example. Within the area 75 are given figures for the declination of the sun at various dates for a period extending between January 4 and July 9, at three-day intervals; only such figures as appear in the third quadrant are shown in FIG. 9. This solar declination table thus complements the solar declination table in the area 65 on the bottom side of the top disc, FIG. 11, which gives such declinations for the remainder of the year; thus the two together provide solar declinations for the entire year, epoch 1965; for future years annual and leap year changes in sun's apparent declination must be considered.

Since both sides of the middle disc and the two concealed sides of the top and bottom disc provide convenient tables arranged in radial lines for quick access to desired data, such radial lines have been arranged circumferentially at progressively increasing or decreasing values. Wherever the given data fail to coincide with that printed on a disc surface, interpolation is of course in order.

Figure 4:
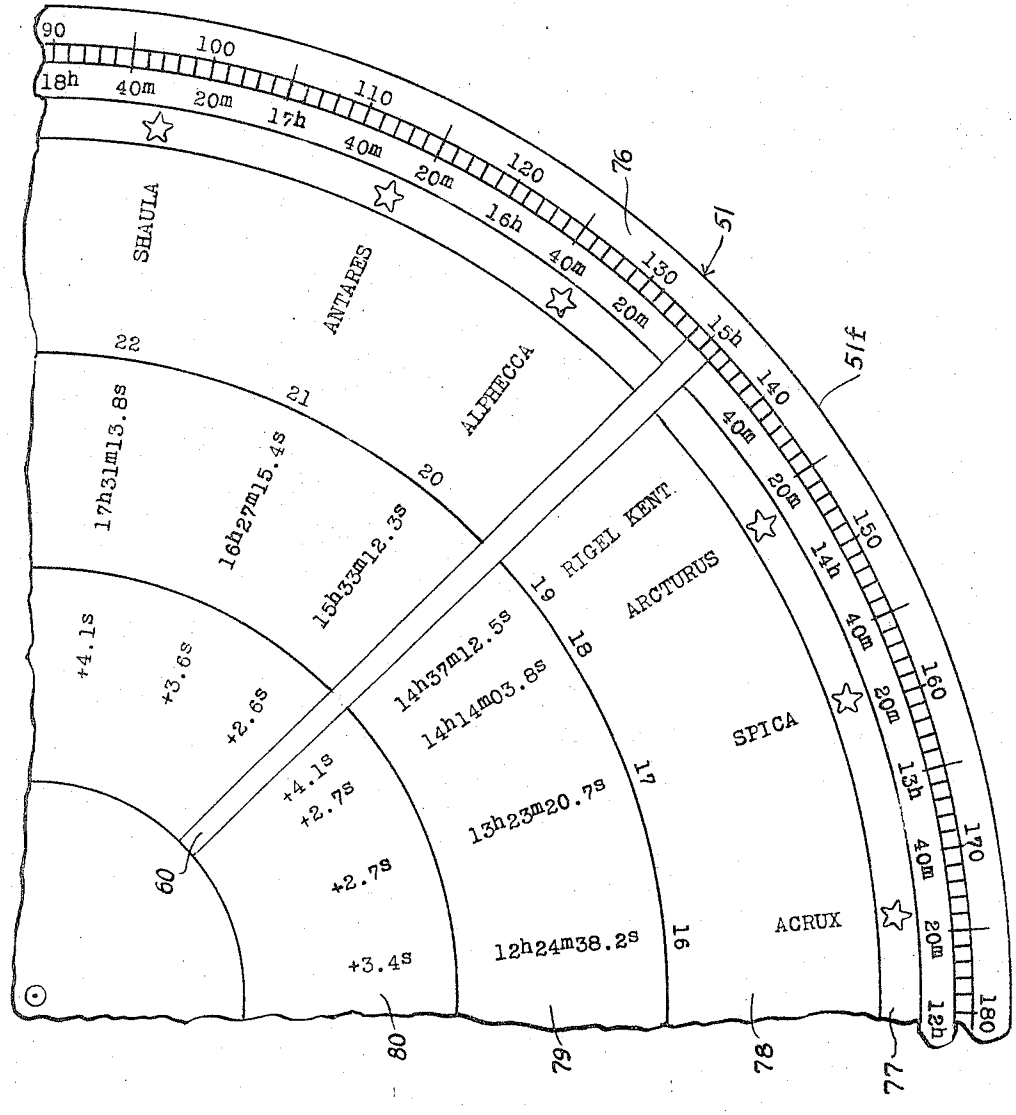
FIG. 4 illustrates the top side of the top disc, quadrant 2, with typical indicia of the top side of the said disc and the location of the window 60 with respect to said indicia.

Referring now to the top side of the top disc 51, FIG. 1, of which only the second quadrant is shown in FIG. 4 at 51f, concentric circles are shown dividing the surface into annular areas 76, 77, 78, 79 and 80. At least those of the concentric circles indicated at 82, 83, 84 and 85 serve an additional purpose which will be discussed below. Within the outermost area 76, a circumferential scale is shown bearing 360 equal divisions. Radially outward from this scale and beginning at the zero point, not shown, and reading clockwise, every tenth division is numbered, thus providing a 360 degree angle or arc scale. Radially inward of and adjacent to the said scale the same divisions are utilized in a time scale wherein every division represents four minutes of time and the whole circumference represents twenty-four hours. This time scale has every hour numbered as well as every twenty-minute interval, reading counter-clockwise with the zero or twenty-four hour line of the scale coinciding with the index line 81.

Within the area 77 are symbols for twenty-seven prominent stars circumferentially arranged according to their space azimuth positions, while in the area 79 are given the times of right ascension of the said stars. In the area 80 are given in seconds and fractions of seconds of time the annual variation in right ascension of the said stars. The stars and the data in the other annular areas relating thereto are also so positioned circumferentially with respect to the above time scale that they as well as the data in the said other annular areas are in radial alignment with the point on the time scale which is indicated by the time of right ascension in the area 79. The right ascensions given are for epoch 1965.

As is well known, the apparent motion of a star through a twenty-four hour period of time is through an angle of 360 degrees. Thus the front face of the top disc 51 may be termed a "space compass" in which the sun and the bright stars (or planets) are coordinates. Because of the small scale of FIG. 1, only the names of the stars, and the symbols therefor which are shown as circles also because of the small scale, appear therein. For the sake of clarity, the drawn lines and data illustrative of examples solved, appearing on FIG. 1, have been omitted from FIG. 4.

Figure 13:
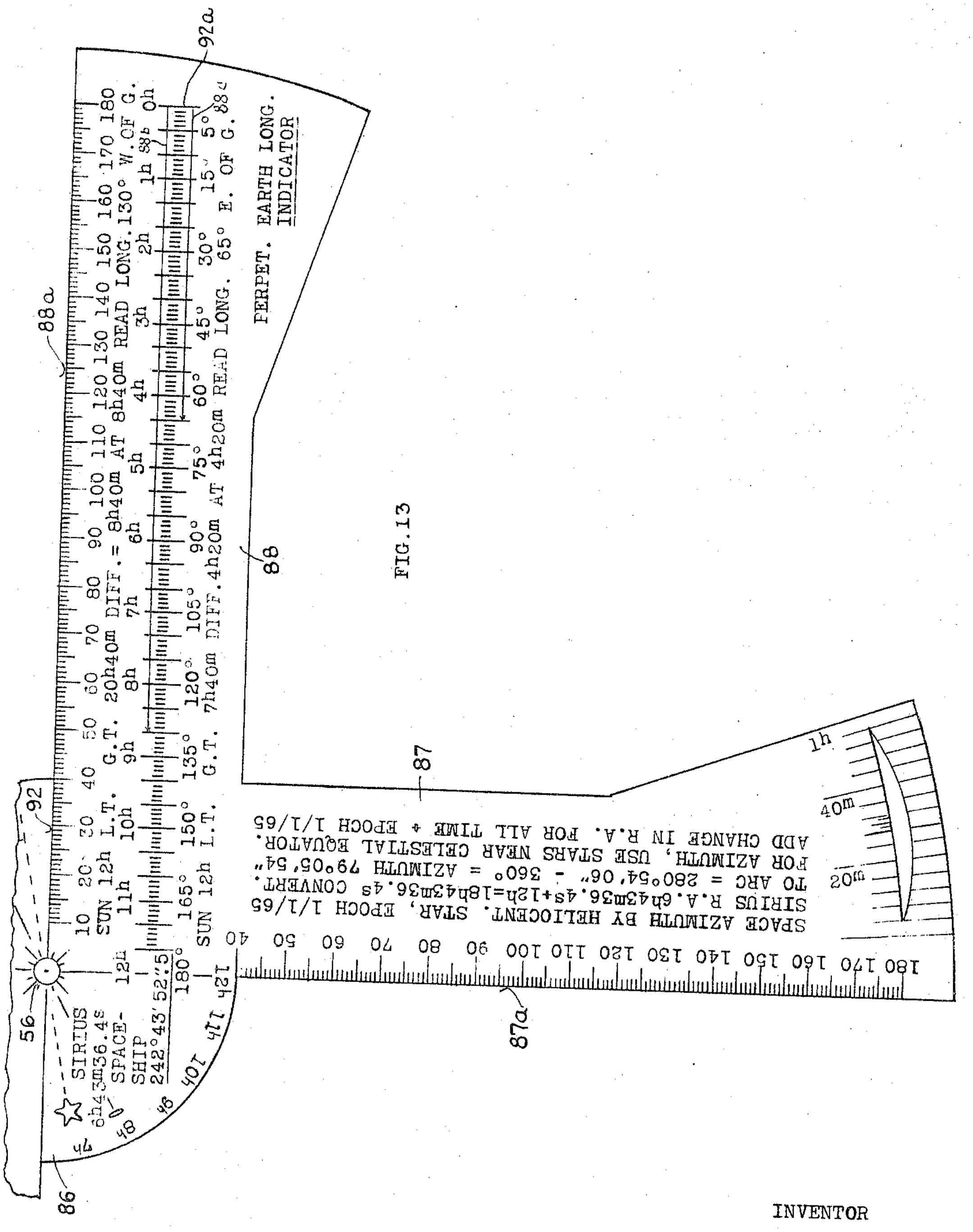
FIGS. 13 and 14 are enlargements of, respectively, the front faces of the two diametrically opposed pairs of mutually right-angle arms of the unitary approximately cross-shaped base scale member seen in FIG. 1; the back of this member is plain.
Figure 14:
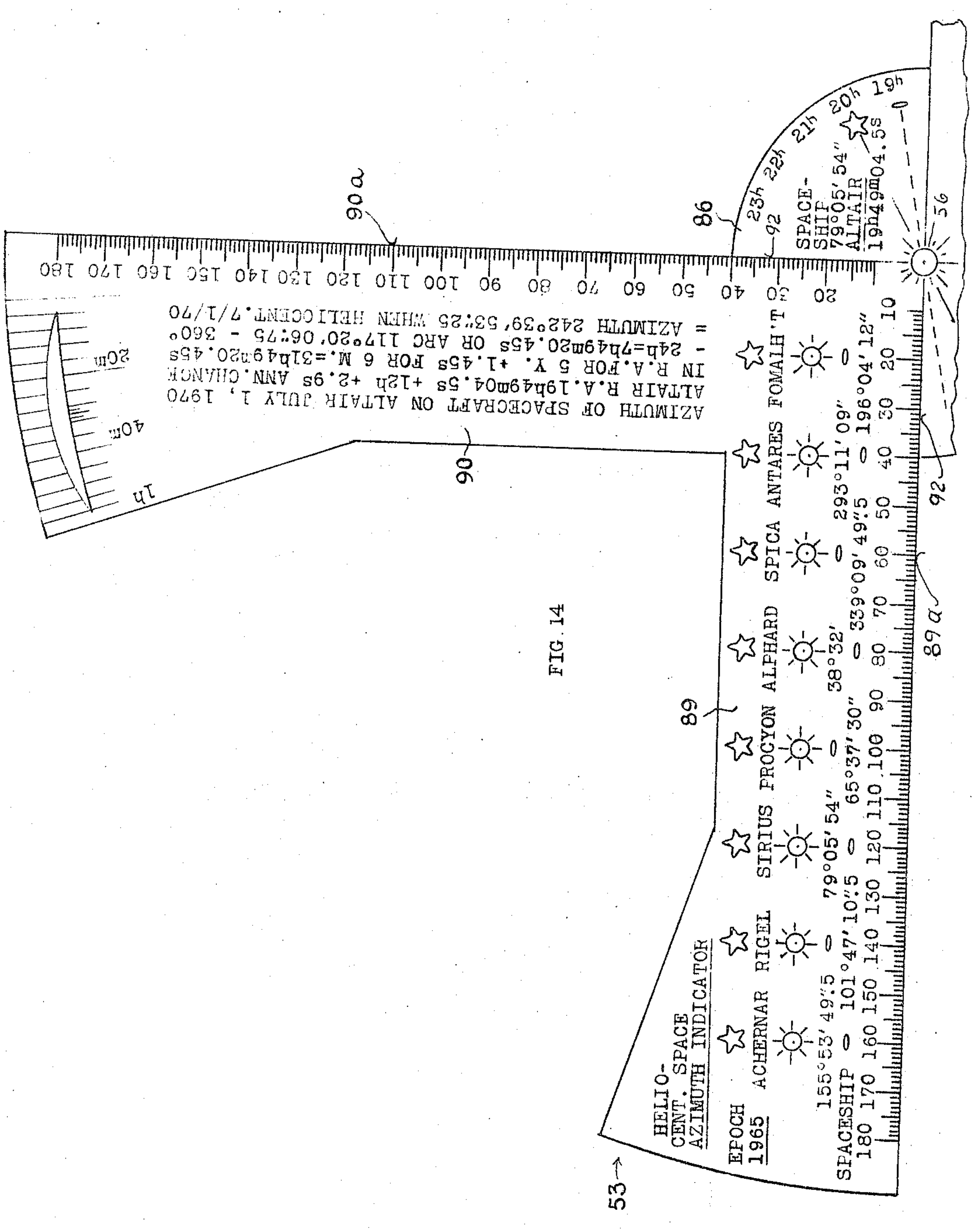

Referring now to FIGS. 1, 13 and 14, the approximately cross-shaped member 53 can be cut out of a flat sheet; it consists of a central portion 86 about the pivotal axis of which is the symbol 56 representing the sun. Opposed pairs of mutually right-angled arms extend in diametrically opposite directions from the portion 86. The arms of one such pair are indicated at 87, 88, and those of the other such pair are indicated at 89, 90. Thus each such pair of arms has a resemblance to opposing squares. The outer edges of the four arms, which bear the same reference numerals as the respective arms followed by the suffix "*a*," all extend radially from the pivot axis of the computer. The borders of the central portion 86 between the two "squares" are arcuately rounded concentric with the pivot axis to provide diametrically opposed parts 91 of an innermost concentric circle as it appears looking down upon the computer, FIG. 1. On the surface of the central portion 86 radial lines each of which is a continuation of the line defining one of the edges 89a–90a, are drawn to the symbol for the sun. Each such edge of each arm bears identical graduations for scalar quantities whose zero is positioned at the pivot axis; thus these edges provide scales which read radially outward to the maximum number of 180. The graduations on these scales may be used as units which may, by applying exponents, be expressed in increased or decreased magnitudes as the particular case calls for, obviously up to quadrillions or higher, including light years or megaparsecs, or down to fractions of millionths or smaller. The concentric circles 83, 84, 85 and 91, FIG. 1 and FIG. 8, serve to "mark off" scalar quantities at every forty graduations of the scales 87a–90a. In the full size representation of the "squares" in FIGS. 13 and 14 these multiple base scales are shown numbered at every ten graduations.

Additionally, the arm 88 has printed thereon on the body thereof and parallel with the edge 88a, a second scale 92a having 180 graduations. Above this scale are legends indicating time from zero hours (h) through 12 hours, reading radially inward, so that each graduation represents four minutes of time. Below this scale are legends for degrees of angles or arc. The arm 88 bears the legend "Perpet. Earth Long. Indicator," in which "perpetual" and "longitude" are both abbreviated. When the observed local time anywhere east or west of Greenwich is observed while simultaneously noting the time on a clock set to Greenwich time, then calculating the difference between the two observations, the resultant time difference is marked off on the time scale and the longitude is read directly on the degree scale. An example of this, to ascertain terrestrial longitude, is printed on the arm 88, FIG. 13; the vector 88b is drawn for a time difference of eight hours and forty minutes, whence the longitude is read as 130 degrees. As a duplicate example, the vector 88c is drawn for a longitude of 65 degrees east of Greenwich when the time difference is four hours and 20 minutes; by virtue of the data given in the line above the vector 88b, the longitude in the first example is west of Greenwich, while the data given in the duplicate example in the line of data below the vector 88c, the longitude is east of Greenwich.

Other examples illustrating the use of the instant computer as so far described are shown partly on FIG. 1 and partly in legends adjacent thereto. As one example wherein it is desired to ascertain the arcuate distance between them, it is assumed that a first spacecraft 93 is heliocentrically oriented on the star Altair and a second spacecraft 94 is heliocentrically oriented on the star Fomalhaut. The space longitude of spacecraft 93 is obtained as follows: the angular positions of the stars shown on the top side of the top disc, FIGS. 1 and 4, are accurately drawn thereon with respect to the scales in area 76. For example, a straight edge or line extending from the center of the sun circle 56 through the center of the star Altair and continuing through scale 76 intersects the latter (not shown) at exactly the value of $19^h49^m04.5^s$. Since this occurs in the first quadrant it is not shown in an enlarged view. However, it is evident from Fig. 4 that each radial line of indicia in the four quadrants of the top side of the top disc thus extending through a star and the sun, includes the precalculated time of the right ascension of the star. Thus the accuracy mentioned is not dependent upon a graphic measurement made on the top disc. Hence, when a spacecraft is heliocentric with Altair its right ascension is read as the said value in the area 79. The right ascension of the star Fomelhaut is similarly directly read by the spacecraft 94 which is heliocentric on Fomelhaut. From the said value for Altair, twelve hours (180 degrees) is subtracted, leaving $7^h9^m04.5^s$ which, converted to arc, equals 117 degrees 16′07.5″, and the latter subtracted from 360 degrees leaves 242 degrees 43′52.5″ as the position of spacecraft 93. The position of spacecraft 84 is similarly obtained, as 196 degrees 04′12″. These positions are of course space longitudes. Subtracting the longitude of spacecraft 94 from that of spacecraft 93 gives their circular arc separation as 46 degrees 39′40.5″, which is shown plotted on FIG. 1. An approximation of this result may be obtained by first aligning the edge 88a of arm 88 of member 53 with the broken line shown extending through Altair to obtain the azimuth or space longitude of the latter, and the aligning the same edge with the broken line through Fomelhaut to obtain the azimuth of this star, with readings taken directly on the scale 76. Such approximation can thus be obtained quickly. Assuming that the scales and indicia on the various discs of the computer are accurately drawn and given, a closer approximation can be obtained with the aid of a magnifying glass.

It is to be understood that the instant computer is not of a so-called "pocket size" but rather has a sufficiently large diameter so that, with the scales and other matter imprinted thereon with a high degree of accuracy and workmanship, readings may be taken directly thereon with a relatively good degree of accuracy. For example, a model at hand has a diameter of fifteen inches.

Figure 12:
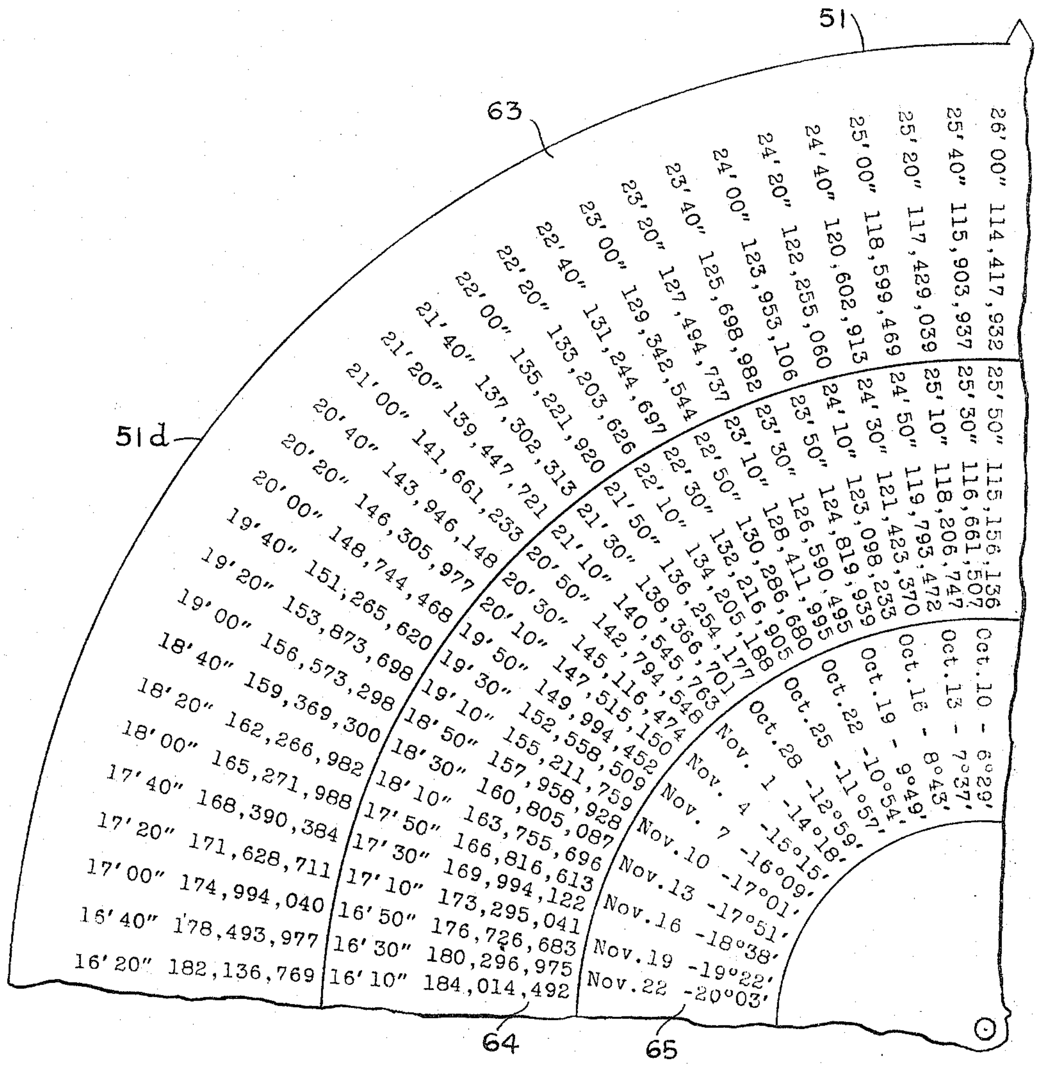
FIG. 12 illustrates quadrant 4 of the bottom side of the top disc.

The distance from the sun of the two spacecraft 93 and 94 is obtained as follows: Assuming that the apparent solar diameter as viewed from both craft is 25′50″, the discs 52 and 50 are first rotated to bring their windows 61 and 62 into alignment and then both are further rotated until these windows are aligned with the solar diameter of 25′50″ in the area 64, FIG. 12, on the back face of the top disc. Next to the said solar diameter in radial alignment therewith is read the distance of both spacecraft from the sun, that is, 115,156,136 statute miles. This is shown plotted on FIG. 1 and indicated by the legend "R.V." (for "radius vector") followed by the said distance. Now to obtain the arcuate distance between the two craft, and given the circular arc of 46 degrees 39′40.5″ between them, the following is done: The window 61 on disc 52 is aligned with the circular arc for 46 degrees in area 71, quadrant 4 of the bottom side of the middle disc 50, FIG. 8, noting the value of 0.8028515 for its function; aligning the window with circular arc of 30′ in area 72 and noting its function of 0.0087266; aligning the window with the arc of 9′ and noting its function of 0.0026180; aligning the window with the arc of 40″ (third quadrant, not shown) and noting its function of 0.0001939; and finally aligning the window with the arc 0.5″ (not shown) and noting its function of 0.0000024. These five values are added together, giving a total factor of 0.8143924. Multiplying the above radius vector by this total factor gives a result of 93,782,282 statute miles as the length of arc separating the two spacecraft. Such multiplication may be done either by simple arithmetic or with the aid of a separate calculating computer.

A further example of the advantage of positioning the stars in radial alignment with their right ascensions for quick reference, is to be noted in FIG. 1, in the case of the star Sirius. With spacecraft 95 heliocentric with Sirius, by rotating member 53 to align scale edge 89a with the broken diametrical line from Sirius through the sun, the point at which scale edge 88a of arm 88 intersects the circumferential scale 76 gives an approximation of the azimuth of this craft as 79 degrees plus, epoch 1/1/65.

The outline of a rectangle indicated generally at 96 in FIG. 1 illustrates graphically how the instant computer may be used for an approximate calculation of dead reckoning. Assuming that it is desired to ascertain departure and the distance traveled is 800 miles on a true course of 30 degrees, then the member 53 is rotated to align the scale edge 88a of arm 88 with the 30 degree angle mark on the scale 76. A base line 97 is plotted at that angle from the center of the disc 51 to a length of 80 graduations which, by using exponents, i.e., the exponent "10," makes the distance 800 miles. After restoring the member 53 to its original position shown in FIG. 1, vectors 98 and 99 are drawn from the terminal of the line 97 at right angles to the scales 90a and 88a, respectively. Departure of 400 miles is then read on scale 88a and approximate latitude difference of 690 miles is read on scale 90a.

In a second dead reckoning example illustrated graphically by the outline of a rectangle indicated generally at 100, FIG. 1, where it is desired to ascertain departure and distance traveled, it is assumed that the known latitude difference is 620 miles and the true course is 216 degrees. Member 53 is then rotated to align scale edge 87a with the 216 degree mark on the scale 76, and the true course line 101 is plotted. After restoring the member 53 to the original position shown, a line 102 is drawn at right angles to the scale 87a from the "62" graduation mark (which exponentially is made to signify 620) to intersect the line 101. A line 103 is then drawn parallel with scale 87a from the meeting point of lines 101 and 102, and where the line 103 meets scale 89a departure is read off at close to 450 miles. The length of the line 101, i.e., the distance traveled, could be approximately measured graphically, but a more accurate answer can be obtained by multiplying "620" by the secant of 36 degrees, to equal 766.36 nautical miles. The value of sec 36 degrees is taken from the first quadrant (not shown) of the bottom face of the middle disc 50, by locking through the window 61 in the bottom disc 52.

Terrestrially curvature of the earth must be taken into account for distances over, say 800 or more miles, and tables such as are illustrated above and to the right of FIG. 1, are readily available for this purpose.

In general, for sea, air and land positions, departure latitude and land positions may be obtained by inspection, given either latitude difference or distance traveled as a base. Latitude difference or distance traveled may be ascertained by drawing the course angle, marking off the distance at the initial point of the two vectors, and reading departure and latitude difference at the terminals of the vectors. All known units of length may be used, with or without application of exponents.

Figure 10:
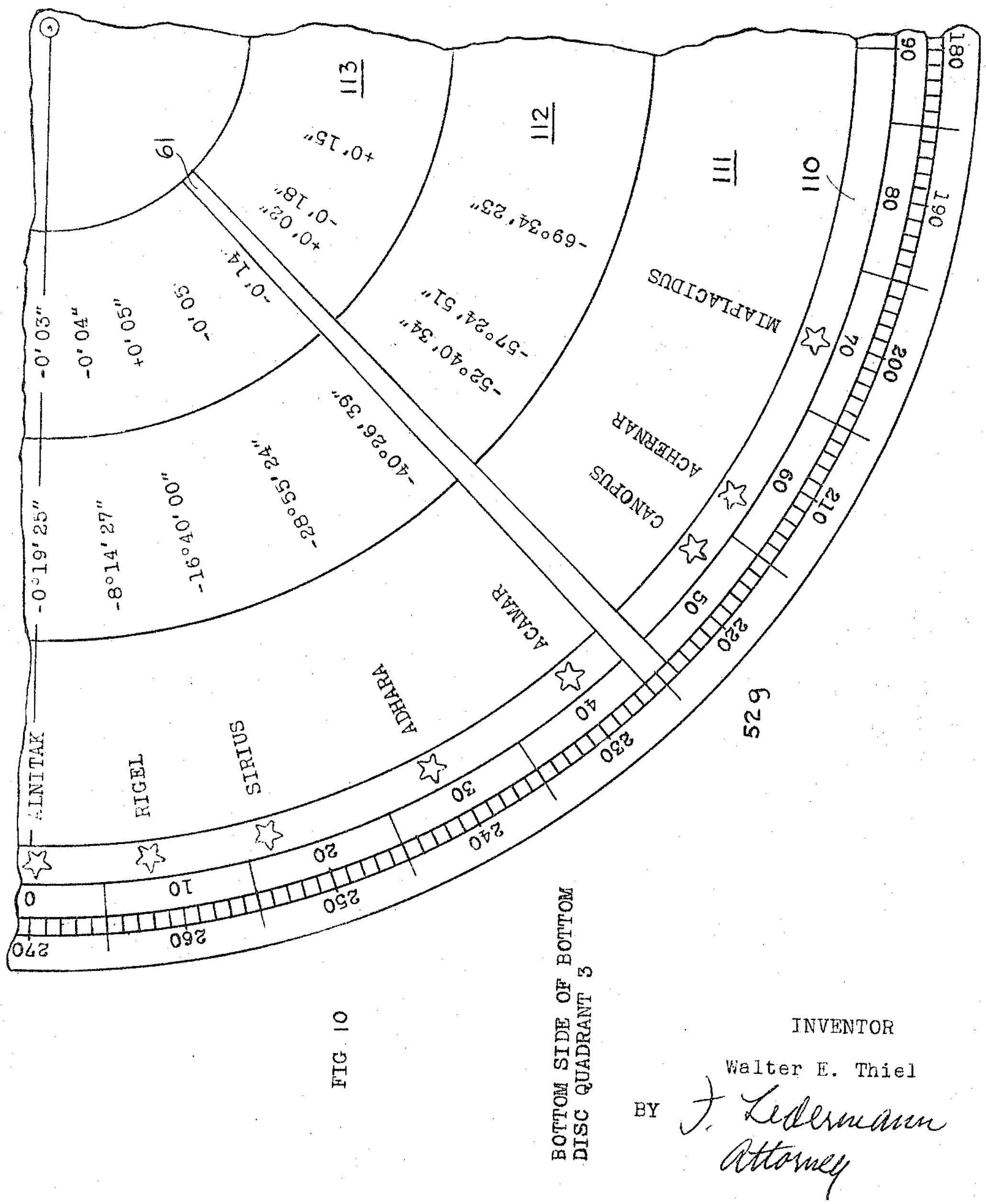
FIG. 10 illustrates the bottom side of the bottom disc, quadrant 3, with indicia typical of the bottom side of the said disc and the location of the window 61 with respect to said indicia.

Referring now to the bottom side of the bottom disc 52, FIGS. 2 and 10 (in which only the third quadrant is shown at 52g), concentric circles 104, 105, 106, 107 and 108 divide the surface into annular areas 109, 110, 111, 112 and 113. In the area 109 a circumferential scale of 360 graduations is provided, being marked radially outward therefrom at every ten degrees reading clockwise from the zero index line 150. Radially inward from this scale are separate scale indicia for each of the four quadrants each ranging from zero to 90 degrees. The latter indicia for quadrants 1 and 4 have their zeros positioned at opposite extremes of the horizontal diameter which represents the celestial equator, and their 90 degree marks at the index line 150. Quadrants 3 and 4 have their zeros similarly positioned and their 90 degree marks at the point diametrically opposite the said index line. Thus the two quadrants above the celestial equator, i.e., quadrants 1 and 4, have their 90 degree point at the Zenith while quadrants 2 and 3 have their 90 degree point at the nadir. In the area 111 the names of stars are printed to extend radially and they are positioned circumferentially in line with their declinations in the area 112. In the area 110 are symbols for the stars, while in the area 113 is given the annual change in declination of the stars. Thus this disc surface may be termed a "space compass."

Figure 15:
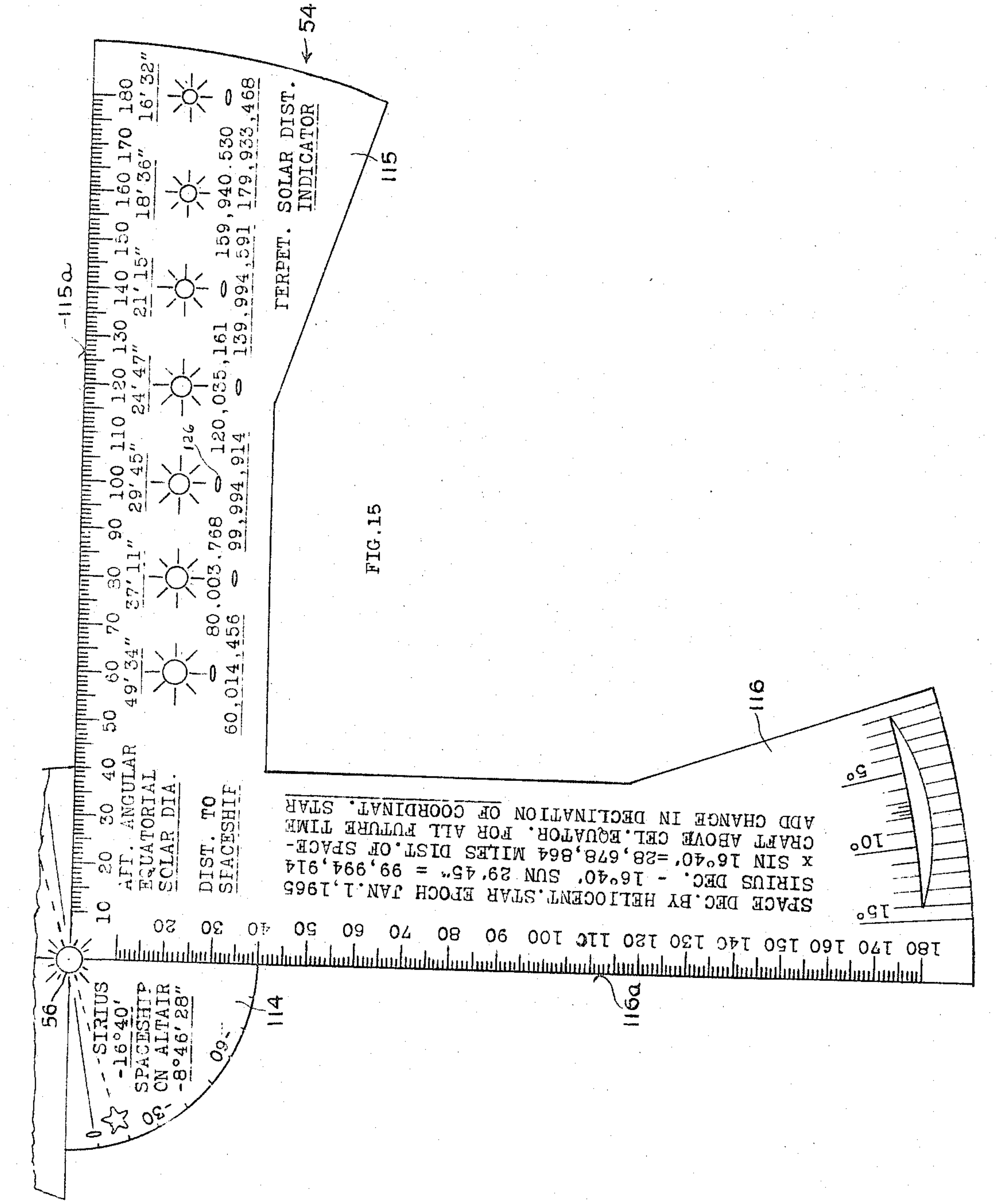
FIGS. 15 and 16 are enlargements, respectively, of the back faces of the two diametrically opposed pairs of mutually right-angle arms of the unitary approximately cross-shaped base scale member shown in FIG. 2; the front face of this member is plain.
Figure 16:
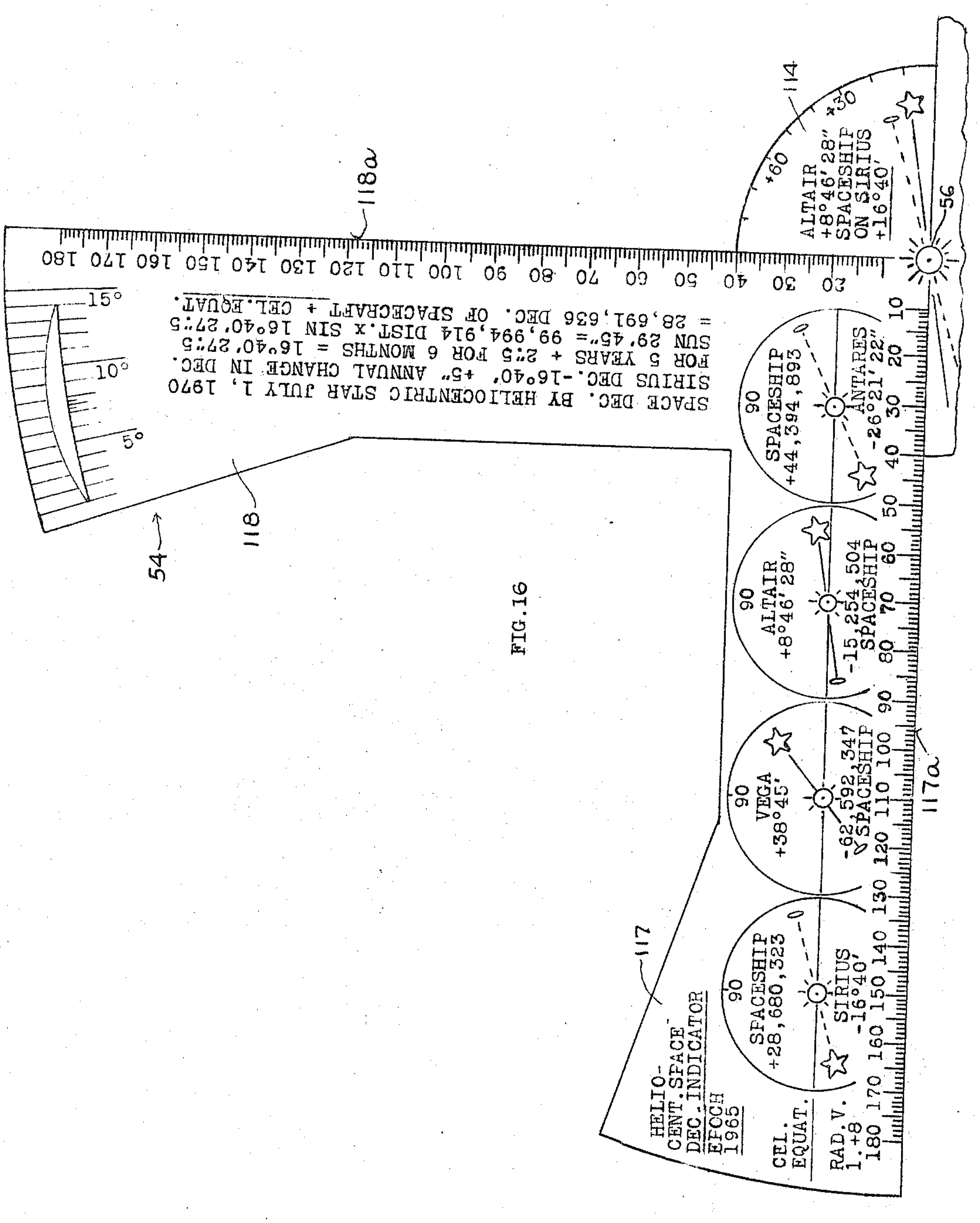

Referring now to FIGS. 2 and 15, 16, the approximately cross-shaped member 54 is identical in dimensions and conformation to the member 53, previously described, and provides a second set of base scales. Opposed pairs of mutually right-angled arms extend in diametrically opposite directions from the center portion 114. One such pair consists of the arms 115 and 116; the other pair consists of the arms 117 and 118. The straight edges 115a and 117a are aligned and a line is drawn through the center portion 114 joining these edges; likewise the straight edges 116a and 118a are aligned and a straight line also joins them through the said center portion. Along each of these four edges is a scale bearing 180 graduations whose zero is positioned on the axis of the computer, i.e., the center of the symbol 56 for the sun. The arm 115 bears a legend "Perpet. Solar Dist. Indicator" wherein the words "perpetual" and "distance" are abbreviated; the arm 117 bears the legend "Helio-Cent. Space Dec. Indicator Epoch 1965" wherein the words "heliocentric" and "declination" are abbreviated.

Shown only in FIGS. 13 and 14 along the diametrically opposed circular edges of the center portion 86, are equidistantly spaced successively numbered hour legends which, when the member 53 is in the neutral position shown in FIG. 1 against the front face of the top disc 51, lie in radial alignment with like-numbered hour legends in the area 76 of disc 51. Similarly, shown only in FIGS. 15 and 16 along the opposed circular edges of the area 114, are equidistant degree graduations and numbers which, when the member 54 is in its neutral position shown in FIG. 2, lie in radial alignment with the corresponding degree graduations in the space 109 of the peripheral scale on the back face of the bottom disc 52.

The following is an example of obtaining latitude and longitude by observation of a single star by using the instant computer as illustrated in FIG. 1. Sirius was observed due south on Oct. 20, 1965, its right ascension (found in the third quadrant, not shown, of the top side of the top disc) is indicated as $6^h43^m36.4^s$. The sun's apparent right ascension for the same date (taken from "The American Ephemeris and Nautical Almanac for Epoch 1965") was $13^h37^m52.97^s$. Subtracting the latter from the former plus $12^h$, gives the local Eastern Standard time as $5^h05^m43.43^s$ a.m. At which time Greenwich time was observed as $10^h01^m23^s$, whence the difference between local and Greenwich times is $4^h55^m40^s$. Converting the said time difference to arc in area 76, FIG. 1 west, gives longitude of close to 74 degrees (360 degrees minus 286 degrees). On the same date the altitude of Sirius was observed, which, after correction by deducting 2′ for refraction, was 32 degrees 27′; subtracting the latter from 90 degrees yields a figure of close to 57 degrees 30′. However, an approximate value for this figure may be read directly on the 360 degree peripheral scale, first quadrant, FIG. 2, by lining up any straight edge of an arm of member 54 with, for approximation, the 32 degree 30′ point on the adjacent 90 degree altitude scale. Finally, subtracting the declination of Sirius (16 degrees, 40′, from FIG. 10) from 57 degrees 30′ (as an approximation), the result is latitude of approximately 40 degrees 50′.

Referring to FIG. 2, the scales or straight edges **115*a*–118*a* serve many purposes, such as, for example, indicating celestial and terrestrial equators as well as due east and due west when used terrestrially. The index 150 serves the dual function of indicating the celestial north pole and true north terrestrially, while the radially opposite point 150*a*** designates the south terrestrial pole.

An example of ascertaining the space declination or altitude of a spacecraft with the instant computer follows. It is assumed that the spacecraft, shown by the heavy dot in FIG. 2 at 126, is observed heliocentric with Sirius whose declination is shown in FIG. 10 as minus 16 degrees 40′. Member 54 is rotated to align the edge **117*a* of arm 117 with Sirius at that declination in area 109 whence the edge 115*a* of arm 115 is aligned with close to plus 16 degrees 40′ which is the declination of the spacecraft; the scale 117*a* represents the rotating solar axis in a vertical plane. From the spacecraft the observed apparent angular equatorial diameter of the sun is 29′45″, whence the precalculated distance from the aircraft to the sun is found on the bottom side of the top disc to be 99,994,914 miles. (A spacecraft bearing the same reference numeral 126 is pictured as an ellipse near the middle of arm 115, FIG. 15, below a symbol for the sun, with this same distance to the sun for the same apparent solar diameter of 29′45″ for ready reference, and on both sides thereof are pictured additional similar sun symbols with apparent solar diameters pictured thereabove and corresponding distances from the sun given below, each such bearing an elliptical representation of a spacecraft, likewise for ready reference.) Going back to FIG. 2, by marking off coordinate lines 127 and 128 to the scales 118*a* and 115*a* respectively with the member 54 in the neutral position shown, marking off close to 100 million miles for the distance to the sun, as an approximation for the above precalculated distance, as a radius vector, the altitude of the craft 126 above the celestial equator read off the scale 118*a*** by equating each division thereon with one million miles, as close to twenty-eight and two-thirds or 28.67 million miles. However, by multiplying the sine of the angle of 16 degrees 40′ (obtained from the top side of the middle disc) by the said precalculated distance to the sun, the said altitude of the craft can be calculated more closely as 28,678,864 miles, above the celestial equator.

It is to be noted that the semi-diameter of the solar disc in relationship to a heliocentric star can be equally and accurately measured when the star is adjacent the sun, to the left or right of the rotatable solar axis in a vertical plane. Both semi-diameters, however, must correspond to the total diameter of the apparent solar disc.

The bottom side of the middle disc, of which only the second and fourth quadrants are shown in FIGS. 7 and 8, has in the peripheral space 58 a 180 degree scale reading down both sides from the zero or zenith index mark 70, for reading altitude with relation to the bottom face of the bottom disc 52. The index 70, FIG. 8, is lined up with the zenith index line 150, FIG. 2; then the observed star's plus declination is added or its minus declination is subtracted and the latitude is read approximately directly on scale 58. This scale also, in relation to the top disc 51, FIG. 1, and the bottom disc 52, FIG. 2, on the respective peripheral scales 76, 109, indicates longitude by converting time difference between local and Greenwich time into arc, and conversely arc into time.

Another example of approximately ascertaining space altitude is indicated on FIG. 2, wherein a spacecraft 129 is heliocentric with Kochab as indicated by the broken line joining the two. Read directly in the lower left-hand quadrant, FIG. 2, on the peripheral scale in the area 109, is the declination of the craft below the celestial equator, that is, approximately minus 74 degrees 20′. With the apparent diameter of the sun observed as 20′50″, its distance from the craft is readily obtained, as previously described, and is found to be 142,794,548 miles. Approximating the latter at 142.8 million miles as the radius vector and drawing coordinates 130 and 131 at right angles to the scale edges **117*a* and 116*a*, respectively, the distance of the craft below the celestial equator may be read off directly on the scale 116*a*** to within considerably less than fifty thousand miles as 137.5 million miles.

It is to be noted that the front of the computer, FIG. 1, when a spacecraft is heliocentric with a star, provides a quick method and means for approximately indicating space azimuth or longitude of the craft, and that the back of the computer, FIG. 2, when a craft is heliocentric with a star in a vertical plane, likewise provides a quick means and method for approximately indicating the altitude or declination of the craft above or below the celestial equator. In other words, the computer provides pivotal dial means for heliocentric space navigation. The pivotal members 53 and 54 serve for instant aligning of spacecraft with the sun to read off, without calculations, angles or arcs to relatively close proximity, while the straight edge scales on the arms thereof similarly serve to read off distances with relatively close accuracy directly without calculations. Such relatively close readings may be made very quickly by astronauts for a quick rough calculation of their position, which may be most necessary in many cases in the future, and they can subsequently obtain more accurate values by utilizing the trigonometric functions, circular arcs, and other data contained on the concealed faces of the various discs.

On the arm 116, FIG. 15, are imprinted an example and instructions for obtaining space declination of a spacecraft by a heliocentric star. On the arm 87, FIG. 13, is imprinted an example of and directions for obtaining space azimuth of a spacecraft by a heliocentric star. On the arm 89, FIG. 14, bearing the legend "Helio-Cent. Space Azimuth Indicator" are printed a number of elliptical symbols for spacecraft, and symbols together with names of various stars as well as the azimuth of the spacecraft when they are heliocentric with the respective stars. On the arm 90, FIG. 14, is printed an example of obtaining the space azimuth of a spacecraft when the latter is heliocentric with the star Altair on July 1, 1970, wherein the annual change in right ascension from epoch 1965, obtained in a now obvious manner from the computer, is multiplied by the factor "5" and taken into consideration.

Any base unit of length, for example, millimeters, centimeters, kilometers, inches, yards, statute miles, nautical miles, light years, parsecs, megaparsecs, may be used as well as others and also fractions of all such units to the millionths or smaller, with or without the application of exponents or factors.

Most important for astronauts is knowing the daily position of their craft from the planet earth for a safe return from a space journey. Using the instant computer, by positioning one of the straight edges of the member 53 in line with the apparent right ascension of the sun for any day of the year, the position of the planet earth will be indicated diametrically opposite, that is, by a separation of 180 degrees, on the scale 76, FIG. 1, whence the approximate angle of earth may be read directly. Adding twelve hours to the sun's apparent right ascension and converting the result into arc which is then subtracted from 360 degrees, gives approximately the position of earth within seconds of arc.

The instant computer may obviously also be used to determine distances to planets and stars, whose diameters are known. Since to many problems solutions have already been provided on the computer, they may be ascertained in a very short time. On the whole this instrument is safe, reliable, and simple enough to be understood by every astronaut; it is compact in size and has a weight of only about one-half pound. Countless ships and planes as well as men have been lost in the past owing to errors in navigation or because trigonometry which is basic in navigation has been too difficult for many to understand. The instant computer has reduced complexity to simple approximate solutions by inspection and serves to provide reasonably accurate, new and useful services where required.

The degrees of accuracy of readings taken on the top face (FIG. 1) and on the bottom face (FIG. 2) of the computer are naturally dependent upon the degree of precision and careful construction of the various parts, especially of the various scales marked off thereon. It is obviously possible to have all scale intervals shown thereon, divided into smaller divisions. For example, wherever a division in a degree scale is shown as equal to one degree, it may be divided into five-minuted intervals or even, assuming the discs are made large enough, into one-minute intervals. With careful precision work in manufacture, such very small divisions may be read through a magnifying glass, and even fractions of such one-minute intervals may be more or less approximately read off. Since refraction gratings are made with slits whose widths are measured in wave lengths of light, very small scale divisions are not impossible on the instant computer. Hence with skillful precision construction readings which were referred to above as approximate may be made with considerable accuracy.

The invention having thus been described, what is claimed and desired to be secured by Letters Patent is as follows:

1. A computer consisting of a flat circular body having a top side and a bottom side, said top side having a plurality of printed concentric circles thereon dividing the same into a first group of annular areas, a printed 360-degree 24-hour hour-angle scale in the radially outermost of said areas, printed symbols for a first plurality of prominent stars in the first next radially inward area, the printed names of said stars in the second next radially inward area, the printed right ascensions of said stars in the third next radially inward area, the printed annual change in right ascension of said stars in the fourth next radially inward area, the name, the right ascension and the annual change in right ascension of each of said stars being positioned in a radial line with the symbol for the star and with a point on the hour portion of said hour-angle scale which reads the same as the time of right ascension of the star, and a flat approximately cross-shaped member comprising a center portion and four arms extending therefrom and spaced ninety degrees from each other, said member and said body being pivoted together at their common center point, said arms having a length such that they extend at least to said hour-angle scale, each of said arms having one edge thereof a straight edge extending radially from the center point of said member, the straight edges of each pair of diametrically opposed arms being in mutual alignment, said arms having printed scales along said straight edges thereof all having the same number of identical divisions and having their zero points positioned at said center.

2. A computer according to claim 1, said bottom side of said body having a plurality of printed concentric circles thereon dividing the same into a second group of annular areas, the radially outermost area of said second group having a printed 360-degree scale extending throughout the circumference thereof and having printed legends positioned radially outward therefrom reading from zero to 360 degrees whereof the zero point is coincident with the 360 degree point and constitutes the zenith point representing the North Pole of the celestial sphere, said last-named scale having positioned radially inward therefrom four sets of printed legends each reading from zero to 90 degrees and occupying one quadrant, the zero position of all of said four sets of legends being positioned spaced 90 degrees from said zenith point and defining the exteremities of the celestial equator, printed symbols for a second plurality of prominent stars in the first next radially inward area of said second group, the printed names of said second plurality of stars in the second next radially inward area of said second group, the printed declinations of said second plurality of stars for a given epoch in the third next radially inward area of said second group, and the printed annual change of declination of said second plurality of stars in the fourth next radially inward area of said second group, the symbol, the name, the declination and the annual change in declination for each of said second plurality of stars being positioned in a radial line with a point on said second-named 360-degree scale which reads the same as the declination of the star, an additional flat approximately cross-shaped member having the same thickness as said first-named cross-shaped member comprising a center portion and four arms extending therefrom and spaced ninety degrees from each other, said additional member and said body being pivoted together at their common center point, said arms of said additional member having a length such that they extend at least to said second-named 360-degree scale, each of said arms of said additional member having one edge thereof a straight edge extending radially with respect to said center point, the straight edges of each pair of opposed arms of said additional member being in mutual alignment, said arms of said additional member having printed scales along said straight edges thereof, said last-named scales all having the same number of identical divisions covering a range of 180 degrees and having their zero positions at said center point.

3. A computer according to claim 2, said body including a top disc and a bottom disc having the same diameter as said top disc, said top side of said body constituting the top side of said top disc, said bottom side of said body constituting the bottom side of said bottom disc.

4. A computer according to claim 3, said body additionally including a concentric middle disc having a diameter larger than the diameter of said top and bottom discs thereby providing a peripheral area on both sides thereof exposed beyond the circumferential edges of said top and bottom discs, said middle disc being pivoted to said top and bottom discs, said peripheral area on said top side of said middle disc having a printed 24-hour scale thereon extending throughout the circumference thereof, said peripheral area on the bottom side of said middle disc having a printed 360-division scale thereon extending throughout the circumference thereof and having a zero point and printed legends reading from said zero point thereof through 180 degrees in opposite circumferential directions whereby the common 180 degree point is positioned diametrically opposite said zero point, said middle disc having on both sides thereof circumferentially spaced radial lines of printed tabular indicia for values of functions of a wide range of angles and circular arcs, said top and bottom discs, having radial windows adapted to be aligned selectively with said last-named radial lines upon relative rotation of said discs.

5. A computer according to claim 4, the bottom side of said top disc and the top side of said bottom disc having circumferentially spaced radial lines of printed indicia giving values of the distance of an observer from the sun for a wide range of apparent diameters of the solar disc as observed in space and additional radial lines of printed indicia for solar declinations at intervals of a few days throughout a year, said middle disc also being provided with a radial window adapted to be aligned selectively with said windows in said top and bottom discs.

6. A computer consisting of a top disc, a bottom disc, a middle disc between said top and bottom discs, and two mutually identical approximately cross-shaped members, said discs and said cross-shaped members being pivoted together on an axis positioned at their common center point with one of said members on top of said top disc and the other of said members positioned on bottom of the bottom disc, said top and bottom discs having like diameters, said middle disc having a diameter greater than the diameter of said top and bottom discs thereby providing a peripheral annualar area exposed beyond the circumferential edges of said top and bottom discs, said members each consisting of a central portion and four arms extending therefrom and spaced ninety degrees apart from each other, said arms having such a length that they extend at least to the circumferential edge of said middle disc, each of said discs having a single radial window extending outward from a position spaced from said axis to a position near to but spaced from the circumferential edge of the disc, said middle disc having on both sides thereof printed radial lines of indicia any line of which on either side thereof is adapted to be made visible through the window in the disc on that side thereof upon alignment of the window with the said line, the top side of said top disc and the bottom side of said bottom disc having circumferentially spaced radial lines of indicia thereon, each of said arms of said members having one edge thereof a straight edge extending radially with respect to said axis, the straight edges of each pair of diametrically opposed arms being in mutual alignment, said arms having graduated scales along said straight edges thereof, said scales all having the same number of divisions of equal width and having the zero position thereof at said axis.

7. A computer including a disc having a top surface provided with a printed peripheral 360-degree 24-hour hour-angle scale and circumferentially spaced printed radial lines of indicia, said lines including the names of a plurality of prominent stars and being circumferentially spaced at angles measured from the zero point of said scale which are proportionate to the right ascensions of said stars for a given epoch, the center of said disc representing the center of the sun, a member superimposed on said top surface and pivotally secured at the center of said member to said disc at the center of the disc, said member having four arms and a central body portion from which said arms extend radially a quadrant apart from each other, the mutually diametrically opposed pairs of said arms having straight edges in mutual alignment through said center of the member and extending radially outward a distance sufficient to intersect said scale.

8. A computer including a disc having one surface thereof provided with a 360-division peripheral scale bearing legends which mark off the scale by increments into four quadrants each reading from zero to 90 degrees, the zero positions of said quadrants all lying at opposite ends of a diameter of said disc whence the 90 degree positions of said four quadrants of the scale lie at opposite ends of a second diameter of the disc which is at right angles to said first-named diameter, said first-named diameter representing the celestial equator and the upper end of said second diameter representing the zenith above the celestial equator, said surface having circumferentially spaced radial lines of indicia including the names of a plurality of prominent stars and being spaced circumferentially at angles measured from said zero positions which are proportionate to their declinations for a given epoch, said center of said member representing the center of the sun, a member superimposed on said surface and pivotally secured at the center of the member to said center of the disc, said member including a central body portion and four arms extending therefrom and spaced a quadrant apart from each other, the mutually diametrically opposed pairs of said arms having straight edges in mutual alignment through said center of said member and extending radially to intersect said peripheral scale.

References Cited

UNITED STATES PATENTS

| | | | |
|---|---|---|---|
| 1,401,446 | 12/1921 | Rude | 235—83 |
| 1,893,235 | 1/1933 | Iverson | 235—83 |
| 1,919,222 | 7/1933 | Jensen et al. | 235—83 |
| 2,064,917 | 12/1936 | Jensen | 235—83 |
| 2,334,135 | 11/1943 | Thurston et al. | 33—75 |
| 2,467,360 | 4/1949 | Young | 235—84 |
| 2,614,329 | 10/1952 | Almorth | 33—75 |
| 3,003,258 | 10/1961 | Stefano | 235—78 |
| 3,109,588 | 11/1963 | Polhemus et al. | 235—88 |
| 3,193,195 | 7/1965 | Jeffries | 235—88 |

RICHARD B. WILKINSON, *Primary Examiner.*

S. A. WAL, *Assistant Examiner.*